United States Patent [19]
Fujii et al.

[11] Patent Number: 4,504,919
[45] Date of Patent: Mar. 12, 1985

[54] METHOD OF CONTROLLING TIRE ASSEMBLY LINES

[75] Inventors: Hiroshi Fujii, Higashi Hiroshima; Akito Okamoto, Hiroshima; Tuyoshi Watanabe, Higashi Hiroshima, all of Japan

[73] Assignee: Mazda Motor Corporation, Hiroshima, Japan

[21] Appl. No.: 411,031

[22] Filed: Aug. 24, 1982

[30] Foreign Application Priority Data

Aug. 25, 1981 [JP] Japan ............................. 56-133799

[51] Int. Cl.³ .......................................... G06F 15/46
[52] U.S. Cl. ..................... 364/478; 29/430; 364/463
[58] Field of Search ............ 364/468, 478, 463; 29/428, 429, 430; 157/1.1, 1.11, 14, 19; 152/330 R; 73/487

[56] References Cited

U.S. PATENT DOCUMENTS 3,930,141 12/1975 Koyama et al. ........... 152/330 R X
3,968,559 7/1976 Karlsson ........................ 29/430
4,069,764 1/1978 Teyssedre .................... 29/430 X

FOREIGN PATENT DOCUMENTS 533527 5/1976 Japan .
53-42882 5/1977 Japan .

Primary Examiner—Joseph F. Ruggiero
Attorney, Agent, or Firm—Burns, Doane, Swecker & Mathis

[57] ABSTRACT

The disclosure is directed to an improved method of controlling tire assembly lines, which makes it possible to correctly and continuously assemble a plurality of kinds of tires automatically by an assembling arrangement in one unit, and also to continuously and successively assemble tires required for respective types of motor vehicles in accordance with manufacturing sequence of the types of motor vehicles to be produced, through a production system which simultaneously manufactures motor vehicles of a plurality of types, specifications and standards by a single production line.

3 Claims, 5 Drawing Figures

METHOD OF CONTROLLING TIRE ASSEMBLY LINES

BACKGROUND OF THE INVENTION

The present invention generally relates to manufacture of motor vehicles and the like, and more particularly, to a method of controlling tire assembly lines in the manufacture of motor vehicles.

Conventionally, for assembly of tires for motor vehicles and the like, it has been so arranged that specific tires for one unit of motor vehicle taken out from a tire pool or storage are temporarily set individually on corresponding wheels for such one unit fed by a conveyor, while the temporarily combined tire and wheel assemblies for one unit of motor vehicle thus prepared, are transported to a tire mounter for being mounted per each one unit of motor vehicle thereat, and then, fed to an inflator for air injection so as to be subsequently subjected to balancing adjustments by a balancer provided at another place for completion of assembly of tires.

The known practice as described above, however, has such problems that, since various apparatuses for the assembly are to be operated by workers or operators, with production planning tables being observed at respective processes, if widths are different in the tires of the same diameter or combinations of wheels and tires are particularly specified in the tires of the same diameter in the case where a plurality of kinds of tires are to be assembled, wrong assembly resulting therefrom may not be found even in subsequent processes, or that a large number of man-hours is required for the transportation between the processing apparatuses or for the assembly of tires, or further that, since a large number of tire and wheel assemblies must be kept in stock for each type of motor vehicle in order to be in agreement with the production plan of the motor vehicle, a large space is inevitably required for the stock.

In connection with the above, there has conventionally been proposed, for example, in Japanese Utility Model Publication Jikkosho No. 53-42882, a tire fitting-in apparatus which includes an arm member mounted on a central shaft fitted into a central portion of a rim so as to project from said central shaft, a pressure roller rotatable about a horizontal shaft and movably supported at an end portion of said arm member for vertical movement, an inclined roller shaft provided on said arm member in a position closer to the central shaft than said pressure roller so as to cross the axis of the central shaft above said rim, and an expansion roller having a trapezoidal cross section and rotatably mounted on said inclined roller shaft. The expansion roller is arranged, at part of its bottom face, to be lower than an outer peripheral edge portion of said rim so as to be inclined to confront said outer peripheral edge, while the arm member and the rim are adapted to be relatively rotatable in a circumferential direction of said rim.

Meanwhile, there has also been conventionally proposed, for example, in Japanese Utility Model Publication Jikkosho No. 53-3527, an air injection device for tubeless tires, which includes a first dome, a reciprocating rod movably supported by said first dome, a pressure piece fixed to one end of the reciprocating rod by a screw, support columns mounted to the first dome for supporting said first dome on a machine frame, an adjusting screw pipe and a depression spring mounted on each of said support columns, an air supply pipe provided in said first dome, an outer casing provided outside the first dome, a second dome mounted to a lower portion of said outer casing, a guide cylinder provided in said second dome, a sliding cylinder provided in said guide cylinder so as to be lowered by air supply from an air nozzle, a pressure contact member provided at a lower peripheral portion of said sliding cylinder so as to be located within the second dome, and a resilient plate mounted to said contact pressure member for lowering a seal portion of a disc wheel through supply of air so as to raise a seal portion of a tire bead as the tire is inflated.

However, it is to be noted that no prior systems have been proposed up to the present which are capable of controlling assembly of tires and wheels through employment of a computer.

It should also be noted here that the conventional tire fitting-in apparatus and the tubeless tire air injection device as described above may be applied to the present invention, although in the present invention, it should be so arranged that jigs are moved by signals from the computer according to diameters and widths of tires to be dealt with.

SUMMARY OF THE INVENTION

Accordingly, an essential object of the present invention is to provide an improved method of controlling tire assembly lines, which makes it possible to correctly and continuously assemble a plurality of kinds of tires automatically by an assembling arrangement in one unit, and also to continuously and successively assemble tires required for respective types of motor vehicles in accordance with manufacturing sequence of the types of motor vehicles to be produced, through a production system which simultaneously manufactures motor vehicles of a plurality of types, specifications and standards by a single production line.

Another important object of the present invention is to provide a method of controlling tire assembly lines as described above, which is highly efficient in operation and can be readily introduced into various production systems of motor vehicles.

In accomplishing these and other objects, according to the present invention, there is provided a method of controlling tire assembly lines, which includes the steps of successively applying information of various kinds of tires for each one unit of motor vehicle, into a computer for the tire assembly lines so as to memorize the information for a plurality of units of motor vehicles in the computer, successively mounting tires and wheels pooled according to the kinds, one by one, onto supply lines for the tires and wheels for continuous transportation thereof per each one unit of motor vehicle, based on the information signal from said computer, into first assembly lines where tire mounters and inflators are sequentially disposed, assembling the tires and wheels thus fed into tire and wheel assemblies by actuating the tire mounters and inflators according to the kinds of tires based on signals from said computer, successively transporting the tire and wheel assemblies one by one, continuously for each one unit of motor vehicle, into second assembly lines provided with balancers for adjusting tires for balancing, causing said balancers to function according to the kinds of tires, based on signals from said computer for the balance adjustment, thereafter, transferring the tire and wheel assemblies thus subjected to the balance adjustment into a discharge line for transportation thereof one by one, and applying confirmation information of the tires or tire and wheel assemblies flowing through the respective assembly lines into said computer from said respective assembly lines for identification and display of flow of tires or tire and wheel assemblies by display means.

In one preferred embodiment of the present invention, the second assembly lines are provided in a plurality of lines arranged in parallel relation to each other, and the tire and wheel assemblies for one unit of motor vehicle are distributed into the respective lines of the second assembly lines for transportation so as to be subsequently transferred into the discharge line in the same order as before supplying, per each one unit of motor vehicle.

In another embodiment of the present invention, the tire and wheel assemblies are in turn distributed, one by one, into the respective lines of said second assembly lines.

The reason for distributing the tire and wheel assemblies combined in the first assembly line in one row or in a plurality of rows, into the second assembly lines having a plurality of rows larger in number than the rows of the first assembly line for the balance adjustment in the parallel relation, is such that, since the time required for the balancing process in the second assembly line is longer than that for the respective processes in the first assembly line, assembling speed is extremely lowered, if the time required for the balance adjusting process is combined with that for other processes.

By the steps according to the present invention as described above, an improved method of controlling tire assembly lines has been presented for efficient and automatic assembly of various kinds of tires, with substantial elimination of disadvantages inherent in the conventional methods of this kind.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
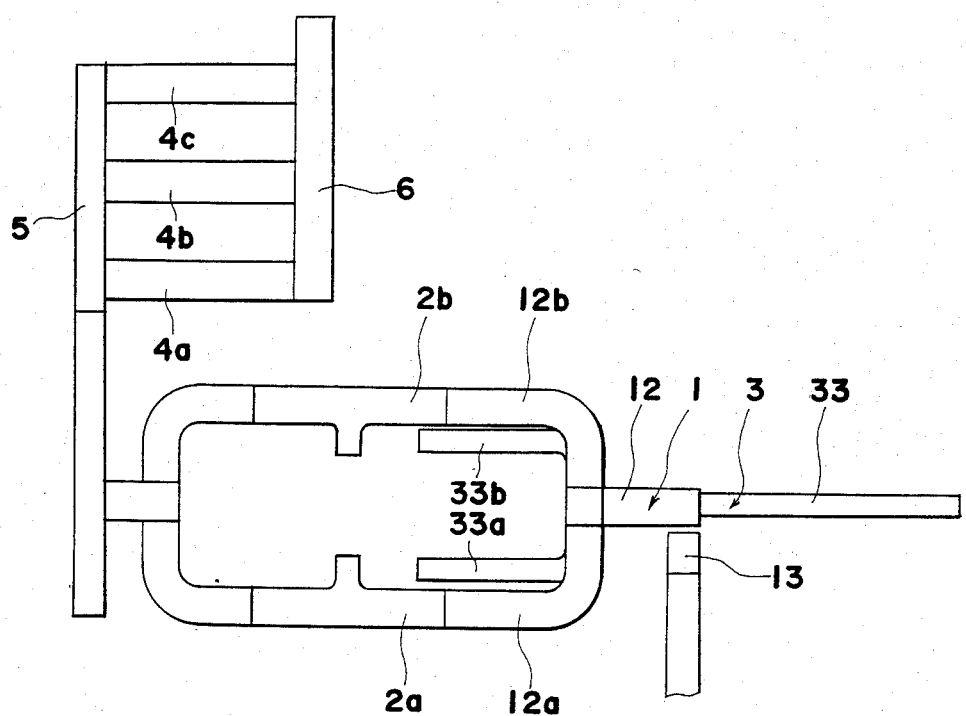
FIG. 1 is a block diagram of an arrangement for effecting a method of controlling tire assembly lines according to one preferred embodiment of the present invention.

Before the description of the present invention proceeds, it is to be noted that like parts are designated by like reference numerals throughout the accompanying drawings.

Figure 2:
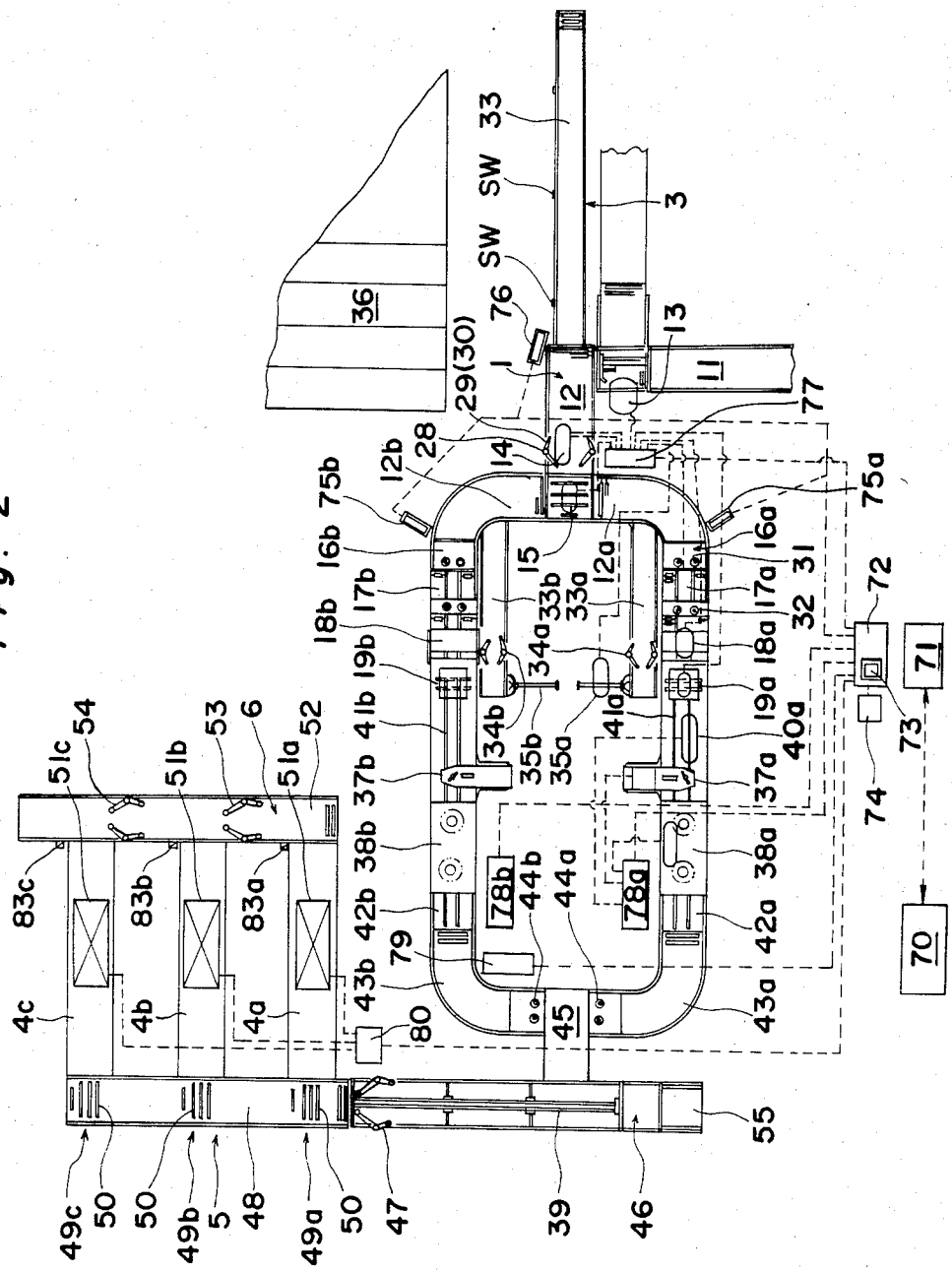
FIG. 2 is a schematic top plan view illustrating a general construction of the arrangement of FIG. 1, FIGS. 3 and 4 are flow-charts for explaining functions of a control apparatus for controlling the arrangement of FIG. 2.

Referring now to the drawings, there is shown in FIGS. 1 and 2, a tire assembly arrangement for effecting a method of controlling tire assembly lines according to one preferred embodiment of the present invention. The tire assembly arrangement of FIGS. 1 and 2 fundamentally includes a tire supply line 1 which successively introduces tires (not particularly shown) pooled or stored according to types of motor vehicles one by one, into the arrangement, and supplies the tires into first assembly lines 2a and 2b according to the order as they are introduced thereinto, a wheel supply line 3 which successively introduces wheels (not particularly shown) pooled or stored according to the types of motor vehicles one by one, into the arrangement, and supplies the wheels also into the first assembly lines 2a and 2b in the order as they are introduced so as to assemble the tires and wheels thus supplied through said tire supply line 1 and said wheel supply line 3, into tire and wheel assemblies in said first assembly lines 2a and 2b, a distribution line 5 which distributes the tire and wheel assemblies transported from said first assembly lines 2a and 2b into a plurality of rows (three rows in FIGS. 1 and 2) of second assembly lines 4a, 4b and 4c which subject the tire and wheel assemblies thus distributed, to balance adjustments, and a delivery or discharge line 6 which joins, per one unit of motor vehicle, the tire and wheel assemblies fed from the second assembly lines 4a, 4b and 4c after the balance adjustments and discharges such tire and wheel assemblies out of the arrangement in the order according to one unit of motor vehicle as they are introduced into the arrangement.

Referring particularly to FIG. 2, the tire supply line 1 further includes a tire supply main conveyor 12, a tire mounting device 13 which mounts onto the main conveyor 12, one by one, the tires laid in five stages on a pallet 9 (FIG. 5) per one unit of motor vehicle and fed through a tire pool conveyor 11, a wheel and tire individual feed device 14 which is provided at a terminal end of said main conveyor 12 for checking each tire so as to feed the tires, one by one, to a work distribution device 15 provided at a terminal end of the main conveyor 12 and arranged to distribute the tires into a tire subconveyor 12a or 12b, tire individual feed devices 16a and 16b which check the tires on the sub-conveyors 12a and 12b for feeding the tires, one by one, into lubricant applying devices 17a and 17b for applying a lubricant onto bead portions of the tires thus fed, and tire setter devices 18a and 18b which feed the tires, one by one, to wheel diameter detection devices 19a and 19b of the first assembly lines 2a and 2b.

Figure 5:
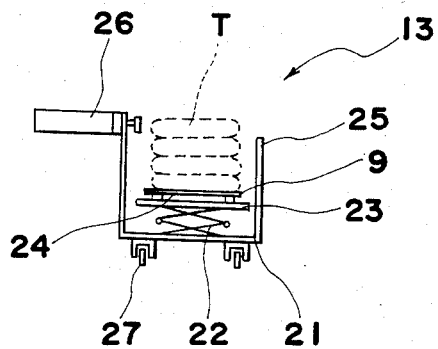
FIG. 5 is a schematic diagram explanatory of a tire mounting apparatus employed for the arrangement of FIG. 2.

As shown in FIG. 5, the tire mounting device 13 as referred to above includes a frame 21, a lift 22 of a pantagraph type mounted on the frame 21, a lift base 23 provided on the lift 22, and a work in-take conveyor 24 having freely rotating rollers (not shown) and mounted on the lift base 23. The frame 21 is also provided with a work stopper guard 25 at its one side and a work feed-out setter 26 of a hydraulic cylinder mechanism provided at an upper portion at its other side. For facilitation of maintenance, inspection, etc., the frame 21 may be provided with wheels 27 at its bottom side for efficient movement. The tires T stacked up on the pallet 9 are raised by the lift 22 and discharged one by one onto the main conveyor 12 by the feed-out setter 26.

Each of the tire supply conveyors 12, 12a and 12b includes a plurality of freely rotating rollers, and is inclined to be lowered towards the terminal end from the starting end thereof for transportation of the tires through action gravity.

Meanwhile, the wheel and tire individual feed device 14 referred to above includes a pair of opposed shafts 28 disposed at opposite sides in the vicinity of the terminal end of the main conveyor 12, a corresponding pair of arm members 29 for tires secured to said shafts 28, another pair of arm members 30 for wheels secured to the shafts 28 in positions below said arm members 29, and a driving means (not shown) for rotating said shafts 28. By the above arrangement, the tires transported on the main conveyor 12 are temporarily stopped by the arm members 29, and upon receipt of signal from a control device to be described later, the arm members 29 are opened or turned so as to transfer the tires towards the work distribution device 15. It is to be noted here that, in synchronization with the transportation of the tires, wheels are also transferred to the work distribution device 15, in the wheel supply line 3 provided in a position lower than said tire supply line 1.

The work distribution device 15 is provided with conveyor portions including freely rotating rollers and arranged in upper and lower stages, and means for turning said conveyor portions between a horizontal position and an inclined position, so that the conveyor portion at the upper stage distributes the tires into the sub-conveyor 12a or 12b, while the conveyor portion at the lower stage distributes the wheels into the wheel sub-conveyor 33a or 33b.

On the other hand, each of the tire individual feed devices 16a and 16b includes a pair of vertically movable stopper pins 31 for feeding the tires one by one, into the lubricant applying device 17a or 17b by vertically displacing the pins 31 through signals from the control device.

Meanwhile, the lubricant applying devices 17a and 17b are each composed of a pair of vertically movable stopper pins 32 and a spray gun (not shown) for spraying a lubricant such as soap water or the like onto bead portions of the tires from upper and lower portions thereof.

Each of the tire setter devices 18a and 18b is arranged to hold the tires on the sub-conveyor 12a or 12b for applying the tire onto the wheel on the wheel diameter detection device 19a or 19b for temporary setting thereof.

The wheel supply line 3 includes a wheel supply main conveyor 33, and sub-conveyors 33a and 33b, with wheel individual feed devices 34a and 34b and wheel setter devices 35a and 35b being respectively provided at the terminal ends of the respective sub-conveyors 33a and 33b. It is to be noted that the supply of the wheels to the main conveyor 33 is effected through taking out of such wheels from a wheel pool or storage 36 by an operator or a robot (not particularly shown).

The first assembly lines 2a and 2b further include the wheel diameter detection devices 19a and 19b which subject the wheels supplied from the wheel supply line 3 to centering and also measure diameters of the wheels, automatic mounters 37a and 37b which automatically assemble the tires and disc wheels temporarily set by said wheel diameter detection devices 19a and 19b, tubeless tire inflators 38a and 38b for transporting tire and wheel assemblies thus assembled to each other and automatically filling tubeless tires with air under specified pressure, a tubed tire inflator 39 for automatically injecting air under specified pressure into tires provided with tubes, and transfer and transport devices 41a and 41b which transport the tire and wheel assemblies temporarily set to each device ranging from the wheel diameter detection devices 19a and 19b to the inflators 38a and 38b one pitch by one pitch.

Each of the automatic mounters 37a and 37b comprises an air or hydraulic cylinder mechanism (not particularly shown) provided at the lower portion of a frame for lifting the wheel and tire assemblies temporarily set, and a roller mechanism (not particularly shown) provided thereover for effecting assembly of the tires. The roller mechanism as described above is arranged to automatically correspond to the wheel diameter by receiving signal representing kinds of wheels, and also to the wheel width through signal from a wheel width detection mechanism provided in the roller mechanism, and is not particularly different from the conventional mechanisms of this kind except for the automatic adjustments thereof by signals.

Each of the tubeless tire inflators 38a and 38b includes an air filling chamber (not particularly shown) having a work positioning center cone provided at the upper portion of the frame and a sealed cap (not shown) for sealing the upper surface of the wheel during filling the tire with air, and a hydraulic cylinder (not shown) provided thereunder for centering and setting the work with respect to the air filling chamber, all of which are provided in two places to correspond to a plurality of kinds of tubeless tires. The construction of each of the inflators 38a and 38b itself is similar to that in the conventional inflator, without any particular difference therefrom, but according to the present invention, the wheel diameter detection devices 19a and 19b, tubed tire setting positions 40a and 40b, automatic mounters 37a and 37b, and tubeless tire inflators 38a and 38b are respectively associated into one assembly line by the transfer transport devices 41a and 41b and the control device to be mentioned later.

On the other hand, driven type roller conveyors 42a and 42b are provided to intersect the terminal ends of the respective transfer transport devices 41a and 41b so as to feed the tire and wheel assemblies discharged from the inflators 38a and 38b towards freely rotating roller conveyors 43a and 43b, while individual feeding devices including stopper pins 44a and 44b are provided at the terminal ends of the roller conveyors 43a and 43b. Between the terminal ends of the roller conveyors 43a and 43b, a roller conveyor 45 is provided, and the tires transported by the above roller conveyor 45 are moved onto a belt conveyor disposed under a tubed tire inflator conveyor 46 so as to be raised through said belt conveyor up to a height of the starting end of the roller conveyor 46 by a lift 55, and thereafter, transferred onto the conveyor 46 so as to be transported downwardly along said conveyor 46 through action of gravity.

The conveyor 46 composed of freely rotating rollers has the tubed tire inflator 39 provided thereon. The inflator 39 includes a pressure switch, a magnetic valve, and air processing appliances, etc. (not shown) accommodated in a box in a known manner, and is connected to an auto-chucker through an air hose (not particularly shown). The tires are automatically filled with air up to a predetermined pressure merely by setting the above auto-chucker to valves of the tubed tires, while the auto-chucker is automatically disengaged from the tire upon completion of air filling.

At the terminal end of the inflator portion conveyor 46, there is provided an individual feed device 47, by which the tire and wheel assemblies are fed out, one by one, onto a roller driven conveyor 48 equipped with a distribution inserting machines, which constitutes the distribution line 5. In the roller driven conveyor 48 as described above, inserting machines 49a, 49b and 49c corresponding in number to the balance adjusting second assembly lines are provided so as to correspond to the respective line positions. Each of the inserting machines includes a plurality of rods to each pivotally supported at one end for rotation between a horizontal posture and an inclined posture, and means for rotating said rods, for example, of an air cylinder or the like so as to insert the tire and wheel assemblies transported and distributed by the roller conveyor 48 into the second assembly lines 4a, 4b and 4c. The respective second assembly lines 4a, 4b and 4c are provided with balancers 51a, 51b and 51c, by which the balance measurements and marking of the tire and wheel assemblies are effected, and weights are attached to the positions of the above markings to complete the assembly of tires. It is to be noted that the balancers as described above may be of a known construction.

In order to transport the completed tire assemblies adjusted for the balance out of the arrangement, for example, to a tire and wheel assembly pool or storage (not shown), there is provided a driven type roller conveyor 52 at the downstream of the second assembly lines 4a, 4b and 4c, and the above roller conveyor 52 is equipped with tire and wheel assembly discharge devices 53 and 54 for discharge of the tire and wheel assemblies in the predetermined order for transportation.

Since the tire assembly arrangement having the constructions as described above can not be subjected to the predetermined functionings as it is, there is provided the control apparatus for associating the respective devices with each other for a systematic function.

The control device as described above includes a line computer 71 having a central processing unit (not shown) which receives tire and wheel assembly original unit signals for several tens of units of motor vehicles from a host computer 70 which controls the whole production line for the motor vehicles, and a host control panel 72 which receives signals from the line computer 71 and control panels, 77, 78a, 78b, 79 and 80 in respective blocks of the tire assembly arrangement for display on display devices 73, 74, 75a, 75b and 76. The line computer 71 which has received the original unit signals of the tire and wheel assemblies from the host computer 70, translates said signals into corresponding signals representing classifications for commit numbers, kinds of tires, kinds of wheels, domestic use and export, tubes tires and tubeless tires, etc. so as to be memorized in an internal memory, and also, to transmit said signals through the host control panel 72, to the display devices 75a, 75b and 76, tire wheel supply control panel 77, mounter and inflator control panels 78a and 78b, tubed tire inflator collection and distribution control panel 79 and balancer control panel 80 respectively for effecting control of the respective devices constituting the tire assembly line, while the line computer 71 also receives the function confirmation signal and work count signal from the respective devices constituting the tire assembly line so as to effect change-over of control signals and display signals and watching of the work positions.

On the other hand, the host control panel 72 receives the display signals from the line computer 71 for effecting watching of works by the use of the television display 73, and also, receives signals for functionings, present positions, troubles or the like, from the respective control panels for indications of functionings, troubles, etc. on the graphic panel 74.

The tire and wheel supply control panel 77 controls the tire mounting device 13, individual feed devices 14 and 16a, work distribution device 15, lubricant applicating device 17a, wheel setter device 35a, wheel diameter detection device 19a and tire setter device 18a, and applies the functioning confirmation signals and work count signals from the respective devices to the host control panel 72. Meanwhile, the lubricant applying device 17b, wheel setter device 35b, wheel diameter detecting device 19b and tire setter device 18b on the other side of the first assembly line are controlled by the other tire and wheel supply control panel (not shown). Moreover, at the side of the wheel supply main conveyor 33, there are provided report switches SW, so that the worker reads the data displayed on the printer 76 and successively mounts the wheels equivalent to one unit of the motor vehicle, one by one, onto the conveyor 33, so as to turn on the report switches SW after mounting of five wheels thereon for notifying the line computer that the operation has been completed. The above arrangement may be so modified that a non-contact type detector, for example, a photo sensor (not shown) is provided on the conveyor 33 for detection of wheels one by one.

The mounter and inflator control panels 78a and 78b respectively control the transfer and transport devices 41a and 41b, tire mounters 37a and 37b, and tubeless tire inflators 38a and 38b for applying functioning confirmation signals and work count signals from the respective devices, to the host control panel 72.

Meanwhile, the collection and distribution control panel 79 controls the roller conveyor 45, individual feed devices 44a and 44b, tubed tire inflator 39, distribution line 5, lift 55 and conveyors 46 and 48 for applying signals from the respective devices to the host control panel 72.

The balancer control panel 80 controls the balancers 51a, 51b and 51c and the discharge devices 53 and 54 for the discharge line 6 so as to apply the functioning confirmation signals, etc. thereof to the host control panel 72.

The display devices 75a, 75b and 76 display the commit numbers, kinds of tires, kinds of wheels, classifications of tubed tires and tubeless tires, classifications of destinations (i.e. domestic use or export) of the tires, etc., on monitor TV or printers.

With the use of one side 2a of the first assembly lines, and the two lines 4a and 4b of the second assembly lines as described so far, the method according to the present invention may be effected in the manner as described hereinbelow.

In the first place, upon input of the original unit signal of the tire and wheel assemblies to be assembled, into the line computer 71 provided at the tire assembly site, from the host computer 70, the original unit signal is translated for displaying the necessary data for a plurality of units of motor vehicles on the printers 75a, 75b and 76. The worker reads the display on the printer 76 and successively mounts the pooled wheels, one by one, onto the main conveyor 33, and after mounting thereon five wheels for one unit of motor vehicle, he turns on the report switch SW so as to subsequently mount the next set of wheels for another one unit of motor vehicle on said conveyor 33 in the similar manner. The wheels placed on the wheel supplying main conveyor 33 are moved on said conveyor by the weight thereof and successively transferred onto the sub-conveyor 33a by the work distribution device 15, and then, fed, one by one, towards the forward portion of the wheel setter 35a by the individual feed device 34a so as to be further fed to the wheel diameter detection device 19a by said device 35a for being subjected to the centering and wheel diameter measurements thereof.

On the other hand, the tires laid on the pallet in five stages and fed by the tire pool conveyor 11 according to the signal from the host computer 70 are successively transferred, one by one, from the above of the stages, onto the main conveyor 12 by the tire mounting device 13 so as to move along the conveyor 12 by the weight thereof, and upon transfer of the tires for one unit of motor vehicle, signals are applied from the tire and wheel supply control panel 77 to the host control panel 72, so that the next set of tires for one unit of motor vehicle are fed to the tire mounting device 13 for subsequent successive transfer of the tires in the similar manner as described above. The tires on the main conveyor 12 are also fed, one by one, to the work distribution device 15 by the action of the individual feed device 14, at the terminal end of the conveyor in the similar manner as in the wheels, and then, by said distribution device 15, are fed to the sub-conveyor 12a so as to successively move over said conveyor 12a. The tires moving on the sub-conveyor 12a are once stopped by the stopper pin 31 of the tire individual feed device 16a, and, upon opening of the gate having the stopper pin 31 by the signal from the control panel 77, they are fed one by one, to the lubricant applying device 17a by the weight thereof, so as to be applied with a lubricant, for example, soap water at the bead portions of said tires. Subsequently, when the gate pin 32 of the individual feed device 16a opens the gate in association with the movement of the gate pin 31, the tire is sent to the tire setter device 18a by the action of gravity, with a subsequent tire being fed to the lubricant applying device 17a, the tires transferred to the tire setter device 18a are laid by said device, onto the wheels previously fed to the wheel diameter detection device 19a and subjected to the centering for the temporary setting.

The tires and wheels fed to the wheel diameter detection device 19a of the first assembly line and temporarily set in the above described manner are raised by the transfer and transport device 41a as they are, and thereafter, transported by a predetermined distance to be lowered at the tubed tire setting position 40a, whereat the tires are forwarded to the mounter 37a through transportation by the transfer and transport device 41a, after setting air valves (not shown) to the wheels by the operator who has read the display contents of the printer 75a in the case of tubed tires, or as they are in the case of the tubeless tires. In the mounter 37a, the tires under the temporarily set state are fitted into the wheels through automatic adjustment of tire pressing portions (not shown) by the signal from the line computer, after checking with the signal of the wheel diameter detection device 19a according to differences in the diameter and height of the tires and wheels. The tire and wheel assemblies thus combined are moved to the tubeless tire inflator 38a by the transfer and transport device 41a. The inflator 38a is provided in two units for large and small diameters, and is arranged to be actuated for injecting air under a predetermined pressure into the tubeless tire assembly, when the tire assembly has reached the particular inflator suitable therefor, and designated and adjusted by the signal from the line computer 71. In the case of the tubed tires, the inflator 38a is not actuated, and the tire assemblies are successively transported further as they are.

The tire and wheel assemblies thus transported to the driven type roller conveyor 42a descend and move by gravity over the conveyor 43a having the freely rotating rollers, and are successively fed, one by one, to the roller conveyor 45 by the stopper pin 44a of the individual feed device, and then, raised by the belt conveyor and lift 55 provided below the tubed tire inflator so as to be moved on the roller conveyor 46 by the action of gravity. In the above case, when the tire and wheel assemblies are of tubed tires, the operator sets the auto-chucker (not shown) to each of the valves (not shown) of the tires, and thus, air adjusted for pressure to correspond to the tire and by the signal from the line computer 71 is filled into the tire.

It is to be noted here that, during injection of air, it may be so arranged that the transportation of tires is suspended, or that, for example, the auto-chucker moves, following the movement of the tire so as to be automatically disengaged upon reaching of the air pressure to the predetermined value for subsequent returning to the original position.

In the manner as described so far, following the preceding set of tire and wheel assemblies for one unit of motor vehicle, the subsequent set of tire and wheel assemblies for another one unit of motor vehicle are successively transported, one by one, from the first assembly lines continuously, and, since the time required for the balance adjustment in the second assembly lines is longer than that required for the assembly of the tire and wheel in the first assembly lines, the tire and wheel assemblies are successively distributed for being supplied into the lines 4a and 4b in two rows of the second assembly lines by the roller driven conveyor 48 and the inserting machines 49a and 49b of the distribution line 5, in order to harmonize the required time in both of the lines. In the above case, on the assumption that the preceding set of tire and wheel assemblies for the one unit of motor vehicle are represented by a1, a2, a3, a4 and a5, with the subsequent set of tire and wheel assemblies for another one unit of motor vehicle being represented by b1, b2, b3, b4 and b5, the tire and wheel assemblies continuously transported over the first assembly lines in the order of a1, a2, a3, a4 and a5, and b1, b2, b3, b4 and b5 are distributed and supplied, by the action of the distribution line 5, alternately one piece by one piece, in such a manner that the tire and wheel assembly a1 is directed to the second assembly line 4a, the assembly a2 to the line 4b, the assembly a3 to the line 4a, the assembly a4 to the line 4b, and the assembly a5 to the line 4a, the assembly b1 to the line 4b and so forth, or alternately, two pieces by two pieces, in such a manner that the tire and wheel assemblies a1 and a2 are directed to the line 4a, the assemblies a3 and a4 to the line 4b, the assemblies a5 and b1 to the line 4a, the assemblies b2 and b3 to the line 4b, and so forth. To the respective second assembly lines 4a and 4b, jigs corresponding to the tires are forwarded according to the signals from the line computer 71 for effecting the balance measurements and markings after positioning of the tire and wheel assemblies by setting the assemblies to the balancers 51a and 51b, and by attaching the weights to the marked positions, the assembly of the tire is completed, while, after completion of assembly for each tire, completion signal is fed from detectors 83a and 83b to the line computer 71.

The tire and wheel assemblies thus completed for the assembly are transferred onto the roller driven conveyor 52 which acts as a joining line, and collected into a set for one unit of motor vehicle by the function of the discharge devices 53 and 54 so as to be transported, one by one, out of the arrangement. More specifically, the preceding set of tire and wheel assemblies a1, a2, a3, a4 and a5 for one unit of motor vehicle are successively transferred onto the roller conveyor 52 one by one, so as to be carried out of the arrangement in that order, and subsequently, the succeeding set of tire assemblies b1, b2, b3, b4 and b5 for another one unit of motor vehicle are transferred onto the roller conveyor 52 one by one so as to be transported out of the arrangement in the similar manner.

It is to be noted here that the tire and wheel assemblies for one unit of motor vehicle may be different in the order within the group, and that, in short, the discharge devices 53 and 54 are so controlled that the group of the preceding tire and wheel assemblies for one unit of motor vehicle is not mixed up with that of the subsequent tire and wheel assemblies for another unit of motor vehicle.

In the tire assembly process as described in the foregoing, if any trouble should take place in the devices such as the mounter 37a, inflator 38a, etc. constituting the first assembly line 2a by some causes, the first assembly line is switched over from the line 2a to the line 2b, and a fresh set of tires and wheels for one unit of motor vehicle are transported to the first assembly line 2b by the work distribution device 15 so as to be successively assembled in the similar manner as in the feeding to the line 2a, while the tires and wheels on the way of assembly and remaining on the first assembly line 2a are assembled semi-automatically or manually and transported to the subsequent line as they are or after repair of the devices.

Furthermore, in the case where tire and wheel assemblies more than ordinarily required must be assembled, both of the first assembly lines 2a and 2b are employed, with simultaneous use of all the second assembly lines 4a, 4b and 4c, and in such a case, the tires and wheels are alternately distributed by the distributing device into the first assembly line 2a, and into another assembly line 2b for each one unit of motor vehicle so that the tires and wheels are combined for assembly at the respective lines for being joined again at the roller conveyor 45. In the above case, the subsequent set of tire and wheel assemblies for one unit of motor vehicle assembled in the line 2b are stopped by the individual feeding device 44b, until the preceding set of tire and wheel assemblies for one unit of motor vehicle assembled in the line 2a are all transferred, one by one, onto the conveyor 45 by the individual feeding device 44a, and after said preceding set of tire and wheel assemblies for one unit of motor vehicle have been all transferred onto the conveyor 45, are transferred thereonto one by one, by the individual feed device 44b. Accordingly, the tire and wheel assemblies are transferred onto the conveyor 46, one by one, according to the order of the group of tires introduced into the arrangement so as to be transported to the distribution line 5. In the distribution line 5, the tire and wheel assemblies are distributed one piece by one piece, or two pieces by two pieces, into the respective second assembly lines 4a, 4b and 4c, and after the balance adjustment thereat, are successively transferred onto the transport line 6 so as to be collected per each one unit of motor vehicle by the discharge devices 53 and 54 for being successively carried out one by one, and thus, following the preceding set of tire and wheel assemblies for one unit of motor vehicle, the subsequent set thereof for another one unit of motor vehicle are also successively fed out continuously one by one.

Figure 3:
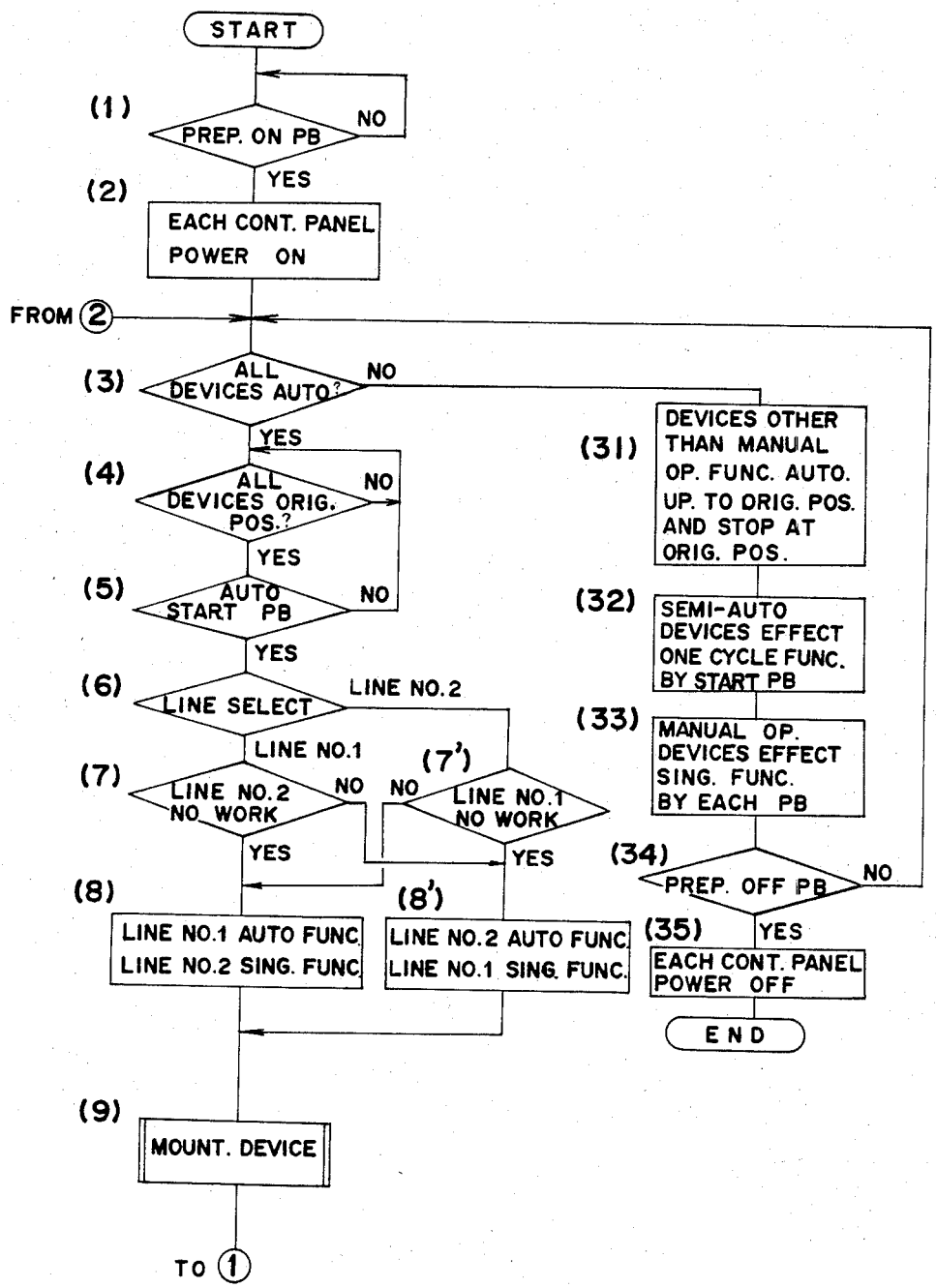
Figure 4:
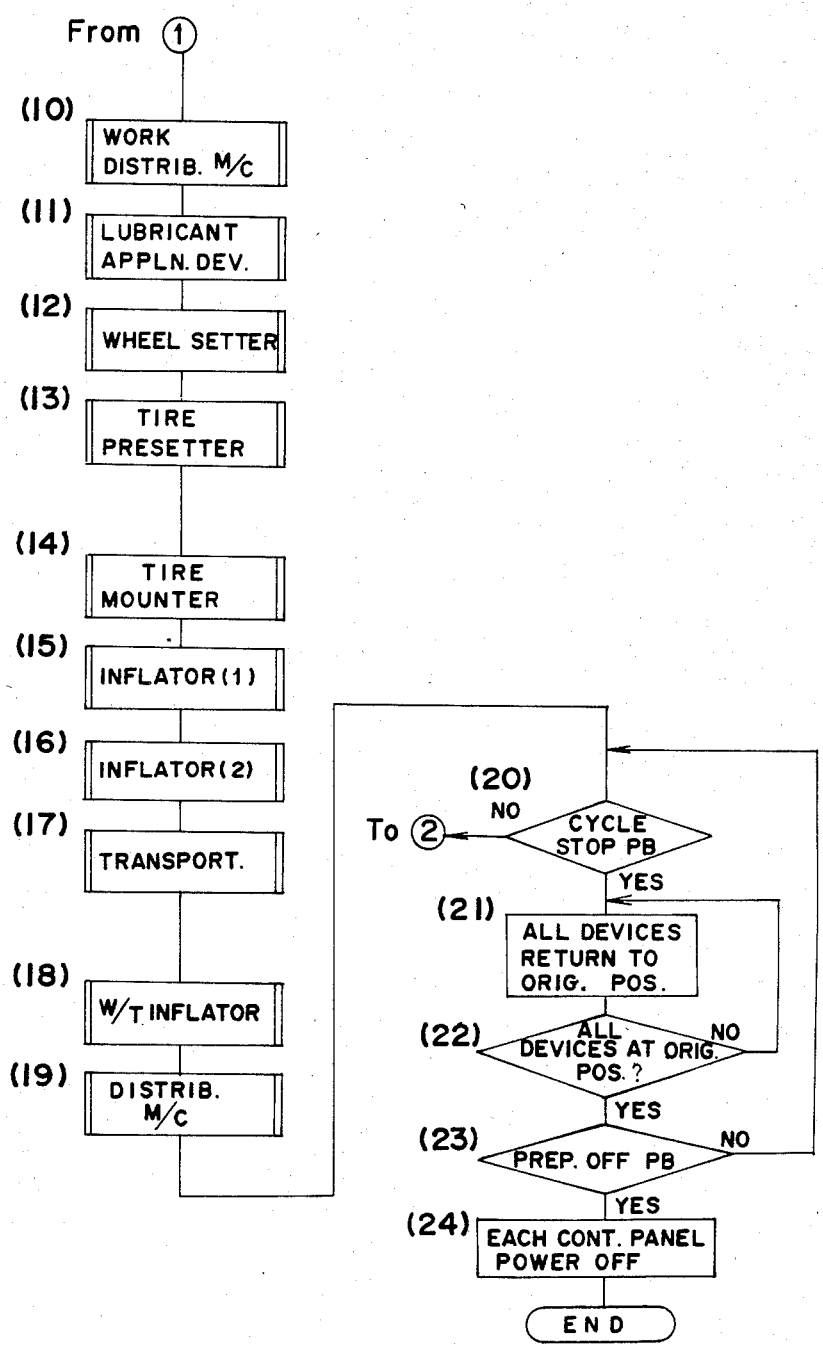

Referring also to FIGS. 3 and 4, the tire assembly arrangement which functions in the manner as described in the foregoing is controlled as follows.

When a power supply for the computer 71 is turned on, the control device functions according to the program memorized in the memory of the line computer 71.

More specifically, upon turning on of the power supply, in the first place, the information for many kinds of tires to be assembled are successively input for each one unit of motor vehicle from the host computer 70 so as to complete the preparation when the input information for the plurality of units of motor vehicles, for example, for fifty units, has been memorized in the memory of the line computer 71, and in the above state, the entire control device starts functioning through depression of a preparation ON. pushbutton PB. On the assumption that a program as shown in FIG. 3 has been memorized in the memory of the line computer 71, the program is started upon turning on of the line computer 71, and judgement is made as to whether or not the preparation ON. pushbutton PB is ON at a step 1. If the judgement is of Yes, the step proceeds to a step 2, while if the judgement is of No, the step is reverted to the initial stage to repeat the judgement until the pushbutton PB is turned on. It is to be noted here that the preparation ON. pushbutton is held until the preparation OFF. pushbutton is depressed.

In the step 2, power supplies for the control panels 77, 78a, 78b, 79 and 80 are turned on, and the step preceeds to a step 3 whereat judgement is made as to whether or not all of the devices for the assembly lines are of automatic operation. If all of the devices are to be operated automatically, the judgement is of Yes, and after confirmation at a step 4 that all the devices are at original positions, the step proceeds to a step 5, whereat judgement is made as to whether or not the automatic start pushbutton is in the turned on state. If the judgement is of No at the steps 4 and 5, the step is reverted to the initial state of the step 4 to repeat the same function. If the automatic start button is on at the step 5, the judgement is of Yes, and either of the first assembly lines 2a and 2b selected by a selecting button is judged at a step 6. If the line No. 1 (2a) is selected at a step 6, presence or absence of the work in the line No. 2 (2b) is judged at a step 7, and if the judgement is of Yes at the step 7, i.e. if it is judged that the work is not present in the line No. 2 (2b) at said step 7, the devices for the line No. 1 (2a) are set for automatic operation, and those for the line No. 2 (2b) are set for individual single unit functioning, while on the contrary, if the judgement is of No, the devices for the line No. 2 (2b) are set for automatic operation and those for the line No. 1 (2a) are set for individual single unit functioning at a step 8'. Meanwhile, if it is judged in the step 6 that the line No. 2 (2b) is selected, similar functionings are effected at the steps 7', 8, and 8', and the step preceeds to a step 9 to actuate the tire mounting device 13 in the manner as described earlier, whereby the tires pooled according to the kinds are successively introduced one by one per each one unit of motor vehicle based on the information applied to the line computer 71. Between the steps 10 and 19, since the respective devices are adjusted and controlled in the manner as described earlier according to the kinds of works (i.e. tires, wheels or tire and wheel assemblies) through the information from the line computer 71, presence or absence of works (i.e. tires, wheels or tire and wheel assemblies) is detected at the respective devices, and such detection signals are applied to the line computer 71 through the respective control panels for displaying the positions or flows of the works on monitor television, while the number of the works is counted so that at each counting of the works for one unit of motor vehicle (five pieces), the information regarding the works for the one unit of motor vehicle is shifted. It is to be noted here that, for the display on the monitor television, the display symbols should preferably be changed (for example, in O and X) so as to allow the works flowing through the lines 2a and 2b of the first assembly lines, to be distinguished from each other.

Upon completion of the cycle for the tire assembly in the manner as described so far, judgement is made at a step 20 as to whether or not a cycle stopping pushbutton is turned on, and if the pushbutton is in the off state, the judgement is of No, and the step is reverted to the step 3 for repeating the routine as described earlier, while on the contrary, if the judgement is of Yes, the step proceeds to a step 21 to return all the devices back to the original positions. At a step 22, judgement is made as to whether or not all the devices are in the original positions, and if the judgement is of No, the step is reverted to the step 21, while if it is of Yes, judgement is made at a step 23 as to whether or not the preparation OFF. pushbutton is turned on. If the preparation OFF. pushbutton is in the off state, the judgement is of No so as to be returned to the step 20, while on the contrary, if it is in the on state, the judgement is of Yes, and the power supplies for the respective control panels are turned off to complete the functionings.

On the contrary, if part of the devices is changed over to the manual operation by any trouble, with the judgement of No at the step 3 representing that all the devices are not of automatic functioning, the step preceeds to a step 31, and the devices other than those rendered to be of manual operation keep functioning automatically up to arrival at the original positions where they are stopped, while the devices rendered to be of semiautomatic operation are maintained in the state of functioning for one cycle through depression of a starting pushbutton at a step 32, and the devices rendered to be of manual operation are maintained in the state of independent single functioning through depression of the respective pushbuttons at a step 33, and thus, in a subsequent step 34, judgement is made as to whether or not the preparation OFF. pushbutton is turned on. If the judgement is of No at the step 34, the step is reverted to the step 3 for repetition of the routine as described above, while on the contrary, if the judgement is of Yes, the power supplies for the respective control panels are turned off to complete the program.

As is clear from the foregoing description, according to the present invention, in the tire assembly lines in which the mounters for assembling the tires and wheels, inflators for filling the assembled tire and wheel assemblies with air, and balancers for subjecting the tire and wheel assemblies thus filled with air to balance adjustments, are sequentially disposed, it is so arranged for assembling a plurality of kinds of tires that information of many kinds of tires is successively input into the computer for the tire assembly lines per each one unit of motor vehicle so as to memorize therein, the information for the plurality of units of motor vehicles, so that the transportation of the tires, wheels, and tire and wheel assemblies and functionings of various devices are controlled according to the information signals successively output from said computer, while the flows of the tires, wheels and tire and wheel assemblies are detected for control through display by identification thereof, and therefore, it has been made possible not only to achive automation and labor saving for the tire assembly lines, but to take quick counter-measures against troubles, while the tire and wheel assemblies for each unit of motor vehicle required for each of various kinds of types of motor vehicles may be successivly assembled through automation in accordance with the production order in a production system in which a plurality of kinds of motor vehicles having different types, specifications and standards.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method of controlling tire assembly lines which comprises the steps of successively applying information of various kinds of tires and wheels for each one unit of motor vehicle, into a computer for the tire assembly lines so as to memorize the information for a plurality of units of motor vehicles in said computer, successively supplying tires and wheels pooled according to the kinds, one by one, onto supply lines for the tires and wheels for continuous transportation thereof per each one unit of motor vehicle, based on the information signal from said computer, into first assembly lines where tire mounters and inflators are sequentially disposed, assembling the tires and wheels thus fed into tire and wheel assemblies by actuating the tire mounters and inflators according to the kinds of tires based on signals from said computer, successively transporting said tire and wheel assemblies one by one, continuously for each one unit of motor vehicle, into second assembly lines provided with balancers for adjusting tires for balancing, causing said balancers to function according to the kinds of tires, based on signals from said computer for the balance adjustment, thereafter, transferring the tire and wheel assemblies thus subjected to the balance adjustment into a discharge line for transportation thereof one by one, and applying confirmation information of at least one of the tires or tire and wheel assemblies flowing through the respective assembly lines into said computer from said respective assembly lines for identification and display of flow of said at least one of the tires or tire and wheel assemblies by display means.

2. A method as claimed in claim 1, wherein said second assembly lines are provided in a plurality of lines arranged in parallel relation to each other, and the tire and wheel assemblies for one unit of motor vehicle are distributed into the respective lines of said second assembly lines for transportation so as to be subsequently transferred into the discharge line in the same order as before supplying the tires and wheels onto the supply line, per each one unit of motor vehicle.

3. A method as claimed in claim 1 or 2, wherein the tire and wheel assemblies are in turn distributed, one by one, into the respective lines of said second assembly lines.

* * * * *